Patented Oct. 17, 1944

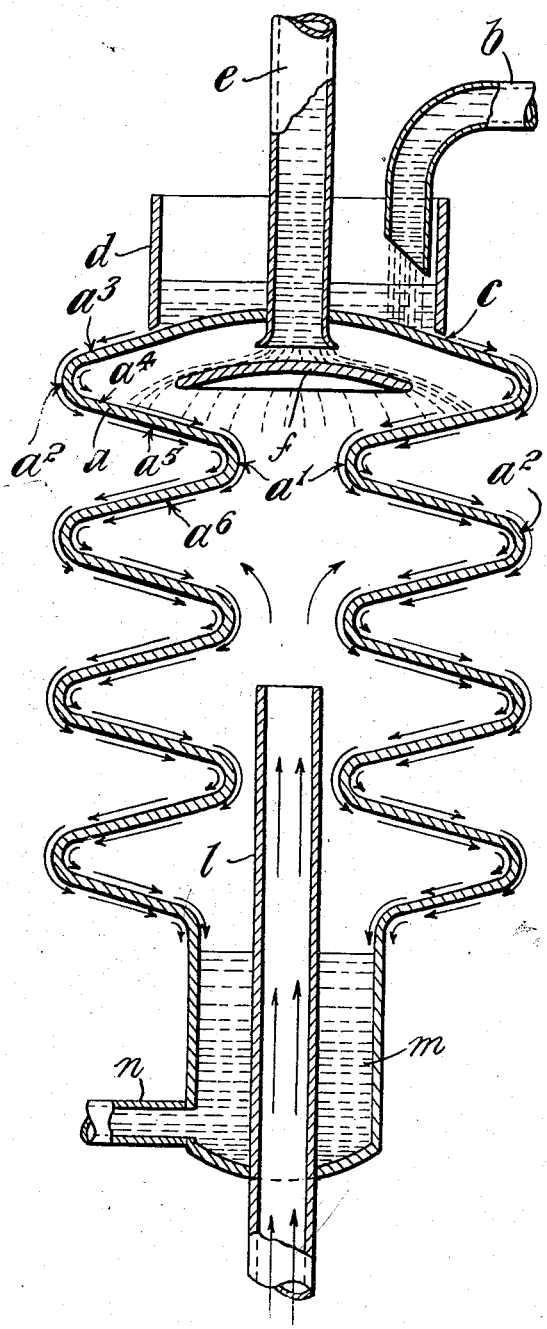

2,360,714

UNITED STATES PATENT OFFICE 2,360,714

HEAT-TRANSFER ELEMENT FOR ABSORBERS

Charles Alfred Payne, Ilford, England

Application December 10, 1942, Serial No. 468,458
In Great Britain December 17, 1941

1 Claim. (Cl. 62—119)

This invention relates to heat-transfer elements for absorbers, and its object is to provide an element giving effective heat-transfer between the fluids involved.

To the above end, according to the invention, a heat-transfer element consists of a column of superposed hollow intercommunicating annular lenticular discs having rounded inner and outer peripheries, with means for supplying liquid to the upper end of the column to flow down in a thin film clinging by surface tension to downwardly directed surfaces of the hollow lenticular discs, and means for applying a liquid to the reverse surfaces of the column. In flowing down inside or outside the column the liquid alternately flows radially inwards or spreads radially outwards over an upwardly directed surface and flows radially inwards or spreads radially outwards over a downwardly directed surface. The thin films of down-flowing liquid exchange heat with either the fluid applied to the reverse surfaces or to a gaseous medium sweeping the films.

A gaseous fluid can be arranged to ascend inside the lenticular column and sweep a film of liquid descending inside the lenticular column.

In an absorber, for instance an absorber of a continuous cycle absorption refrigerating machine, absorbent liquor flows down the inside surface of the lenticular column and cooling water flows down the outside surface thereof, and vapour to be absorbed is admitted to the interior of the column.

The invention is somewhat diagrammatically illustrated by way of example in the accompanying drawing, which shows a vertical section of a lenticular column serving as an element of an absorber.

Reference character $a$ designates a column of superposed hollow intercommunicating annular lenticular discs having rounded inner peripheries $a^1$ and rounded outer peripheries $a^2$.

The closed hollow lenticular column $a$ is used as an element of an absorber for a continuous cycle absorption refrigerating machine. Cooling water, supplied by a pipe $b$ and spread through an annular gap $c$ at the bottom of a cylindrical trough $d$, flows down the outside of the column $a$. Weak absorption liquor is supplied by a pipe $e$ and is spread by a domed spreader disc $f$ to flow down the inside of the column $a$. Vaporised refrigerant ascends a pipe $l$ into the column $a$ and is absorbed by the descending weak liquor. The resultant enriched absorption liquor collects in a sump $m$ at the bottom of the column $a$ and passes therefrom through a pipe $n$.

The lenticular column $a$ is assumed to be composed of metal.

The diameter of each lenticule and the slope of each upwardly or downwardly directed radial surface $a^3$, $a^4$, $a^5$, $a^6$ should not exceed that at which, with a suitably restricted flow of liquid, the velocity acquired will destroy adhesion by surface tension. For instance, with water the diameter should not much exceed one foot and the slope not greatly exceed 15°.

I claim:

An element of an absorber of a continuous cycle refrigerating machine consisting of a closed hollow column of superposed hollow intercommunicating annular lenticular discs having rounded inner and outer peripheries, means for supplying cooling liquid to the upper end of the exterior of said column to flow down in a thin film clinging by surface tension to downwardly directed outer surfaces of said hollow lenticular discs, means for supplying weak absorption liquor to the upper end of the interior of said column to flow down in a thin film clinging by surface tension to downwardly directed inner surfaces of said hollow lenticular discs, means for supplying vaporised refrigerant into said column, and means for withdrawing enriched absorption liquor from within said column.

CHARLES ALFRED PAYNE.